Nov. 13, 1945.  S. M. MacNEILLE ET AL  2,388,858
STEREO TRAINER
Filed Sept. 2, 1943  2 Sheets-Sheet 1
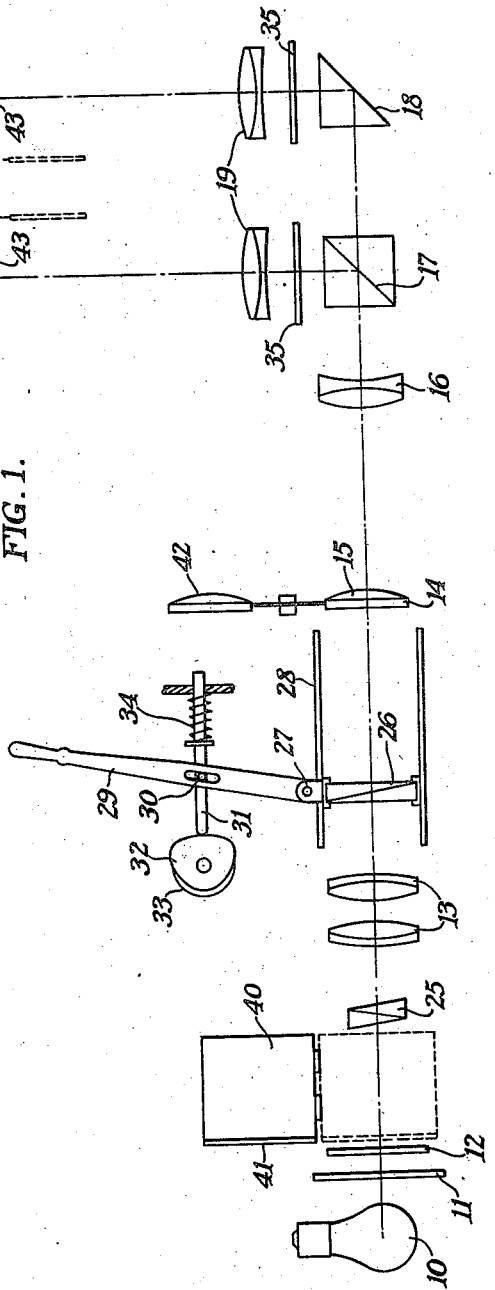
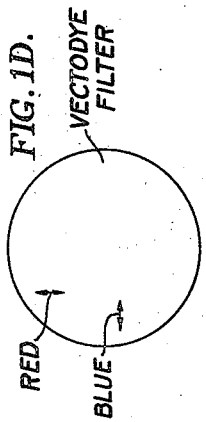
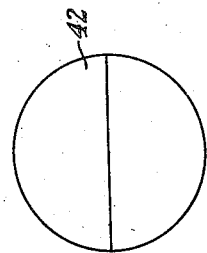
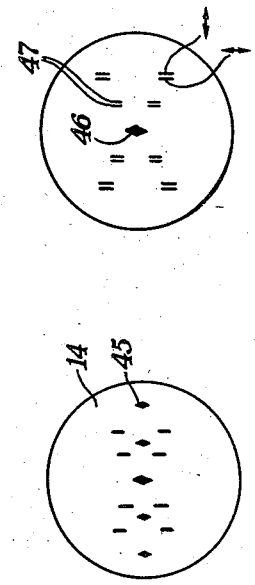
STEPHEN M. MacNEILLE
GEORGE J. KOCH
INVENTORS
BY
ATTY & AG'T

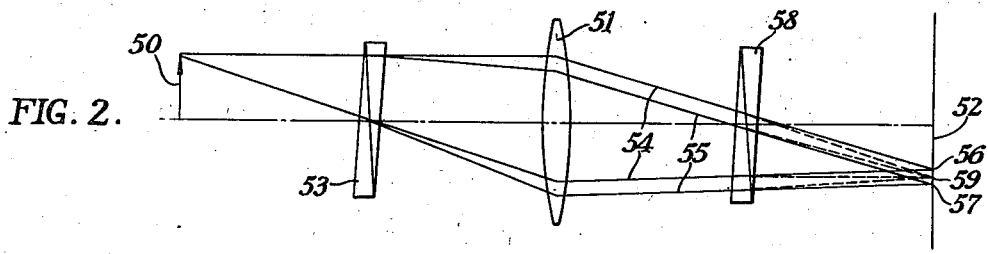
FIG. 2.
FIG. 3.   FIG. 4.   FIG. 5.
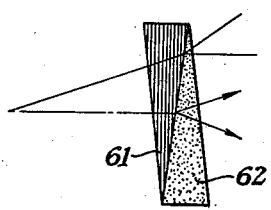   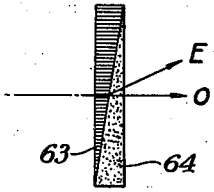   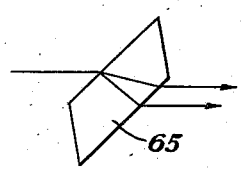
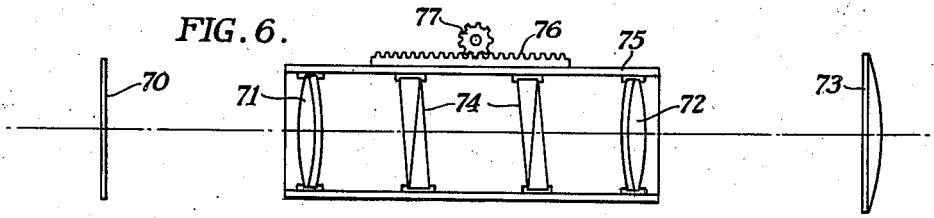
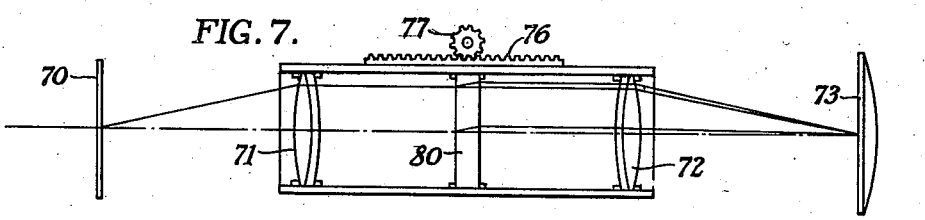
FIG. 8.   FIG. 9.   FIG. 10.   FIG. 11.
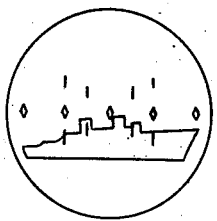   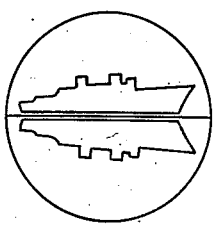   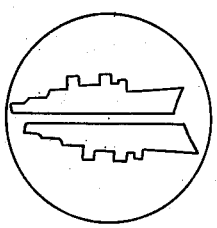   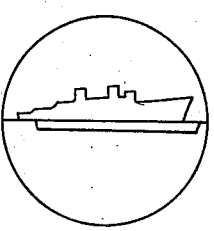
FIG. 12.
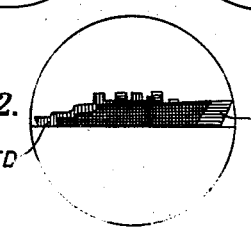
STEPHEN M. MacNEILLE
GEORGE J. KOCH
INVENTORS
BY
ATTY & AGT Patented Nov. 13, 1945

2,388,858

UNITED STATES PATENT OFFICE 2,388,858

STEREO TRAINER

Stephen M. MacNeille, Oak Ridge, Tenn., and George J. Koch, Rochester, N. Y., assignors to Eastman Kodak Company, Rochester, N. Y., a corporation of New Jersey Application September 2, 1943, Serial No. 500,943

18 Claims. (Cl. 88—20)

This invention relates to optical instruments, particularly to those for testing and training stereo vision.

The primary object of the invention is to provide an instrument for producing stereo images of slight, preferably variable separation. The images are polarized mutually at right angles to permit separation by suitable polarizers for stereo viewing. Preferably the range of separation of the images includes zero.

According to the invention these images are produced by the inclusion of birefringent means such as a pair of Wollaston or Rochon prisms or a single birefringent crystal, in series with an objective. A target, such as a transilluminated picture or even an original scene itself, is imaged by the objective in a primary image plane. The birefringent means in series with the objective splits this image into two images polarized at right angles. To vary the separation of these images, the birefringent prism is moved back and forth along the optic axis of the objective. The objective itself may also move, particularly in the embodiments of the invention where variable magnification is also desired or where a constant conjugate objective, such as two positive lenses of equal power separated by twice the focal length of either, is used.

One preferred form of the invention has two Wollaston or Rochon prisms in series with the objective, one ahead of it and the other following it. One of these prisms is movable axially, and they are oriented oppositely so that for one position of the movable Wollaston or Rochon, the two prisms exactly nullify each other giving zero image separation.

In a stereo training or testing instrument, these images are viewed by the right and left eyes of an observer respectively through polarizing filters oriented mutually at right angles to each other so that only a single image is seen, but in depth. Variation of the separation of the images thus produces an apparent variation in depth. A standard comparison reticle may be included in the primary image plane and will appear at the same distance as the image when the separation of the two images is zero, provided, of course, the observer has proper stereo vision.

One form of test includes mechanical means for moving one of the birefringent prisms and manual means for restoring the prism to the zero setting. An observer attempts to maintain the apparent image at the same distance as the standard reticle, and a record of his effort serves as a test of his stereo acuity. Reference is made to copending application Serial No. 500,944, by Wittel, Koch and Boon, filed concurrently herewith. This copending application describes various forms of such instruments incorporating the present invention.

Instead of a simple standard reticle, a depth reticle in the form of a pair of vectographic images superimposed in stereo register may be used. The two vectographic images are oriented with their vibration axis mutually at right angles and orthogonal to the birefringent means so that one eye sees only one of the vectographic images and vice versa. The term vectographic is here used in the simplest of its exact meanings, to refer to an image whose density varies with the direction of polarization of the illumination incident thereon. Those familiar only with the stereo forms of vectographs often refer to the pair of superimposed images as a single vectograph whereas more precisely it should be referred to as two vectographs.

The images in the primary image plane are relayed through a suitable beam splitter to the right and left eyes of an observer; preferably the beam splitter is positioned in a collimated beam between two positive lenses or sets of lenses. The first lens picks up the light from the primary image plane and collimates it. After this light is split into two beams, it passes respectively through objectives into focus in the image planes of the right and left eye eyepieces respectively. Polarizing filters are included in these right and left eye beams. The reticle described above may be positioned in the focal planes of the eyepieces, i. e., in the secondary image planes, which has the advantage that vectographic reticles are not needed for the product of depth, but the disadvantage that the relative position of the two reticles in these secondary image planes must be accurately controlled.

In one form of the invention the principal reticle mark is an etched one accurately in the primary image plane and the depth marks are in the eyepiece image planes and do not have to be so accurate since their main function is merely to give a fixed sense of depth to the observer.

According to a preferred embodiment of the invention intended to simulate inverted field types of range finders, a reflecting surface such as a front surface mirror is placed immediately in front of the target lying on the optic axis of the system or approximately on this axis in a plane parallel to the plane of divergence of the birefringent prism. A shield is included to cut off light from the part of the target behind the mirror so that the rest of the target and its virtual image seen in the mirror constitute the effective target.

Another preferred feature is in the form of differently colored color filters in the right and left eye beams or better still, a single vectodye filter in the primary image plane whose color is different for the two directions of polarization of the incident light.

According to the invention of F. E. Tuttle, described in copending application, Serial No. 500,906, filed concurrently herewith, this mirror system may be combined with a half-wave retardation plate over ½ of the image in the primary image plane. A half-wave retardation plate effectively rotates the polarization of light through 90° so that a pair of images seen ortho-stereoscopically in ½ of the field correspond to a pair seen pseudo-stereoscopically in the other half of the field. The above-mentioned vectodye filter, if placed optically ahead of the half-wave plate in this case, colors the ortho pair of images oppositely to the pseudo pair.

Other advantages and preferred embodiments of the invention are described below in connection with the accompanying drawings, in which:

Fig. 1 shows the optical system of a stereo testing instrument incorporating the invention. Figs. 1A and 1B illustrate forms of comparison standard reticles for use in this instrument, Fig. 1C illustrates a half-wave retardation plate to be used in the image plane, and Fig. 1D shows a vectodye filter which may be used in the image plane;

Fig. 2 illustrates the operation of the optical system;

Figs. 3 to 5 illustrate various forms of birefringent devices useful in the invention;

Figs. 6 and 7 illustrate optical systems alternative to that shown in Fig. 2;

Figs. 8 to 12 show the arrangement of the images in the primary image field with various forms of the invention.

In Fig. 1 light from a lamp 10 through a light diffusing screen 11 illuminates a target 12, for example in the form of a picture of a boat. An objective 13 forms an image of this target in the primary image plane 14, which includes a field lens 15. This image is relayed by a collimating lens 16 through a beam splitter consisting of a semitransparent surface 17 and a reflecting surface 18 to be brought to focus by lenses 19 in secondary image planes at the focus of the eyepieces 20 to be viewed respectively by the right and left eyes of an observer. According to the invention birefringent means, consisting of two Wollaston prisms 25 and 26, is included in series with the objective 13 to split the image into two images in the principal image plane 14, polarized mutually at right angles. The prism 26 carried by a mount 27 is axially movable in guides 28 to provide variable separation of the images. For one position of the prism 26, the effects of the two prisms 25 and 26 exactly nullify each other to give zero image separation. This movement of the prism 26 is provided by a lever 29 pivoted at the point 30. This pivot 30 is carried on a member 31 engaging a cam 32 driven by a motor 33 so that the member 31 is moved back and forth against the pressure of a spring 34. Polarizing filters 35 mutually at right angles and included in the right and left eye beams respectively permit each eye to see only one of the images, with the result that these images have an apparent depth depending on their separation. When the images have zero separation, a normal observer with proper stereo vision should see the image apparently at the same distance as any standard reticle included in this primary image plane 14. Such a reticle is shown as 45 in Fig. 1A.

As described in detail in the Wittel et al. application, mentioned above, the Wollaston prism 26 is driven back and forth by the cam 32 to vary the apparent image distance while the observer attempts to keep this image distance constant and matched to that of the standard reticle by means of the lever 29. That is, the observer attempts manually to maintain zero separation of the polarized images, and to overcome the effect of the movement of the pivot 30 by the cam 32.

In certain stereoscopic range finders the reticle includes both a mark at a standard or comparison distance and additional marks apparently spaced in depth to aid in adjusting the instrument. To simulate such range finders, a vectographic reticle such as shown in Fig. 1B may be substituted in the image plane 14. This vectographic reticle consists of a single mark 46 visible to both eyes and pairs of polarized images 47 differentially visible by the right and left eyes to have an apparent depth in front of or behind the main mark 46.

Alternative to the use of a vectographic reticle, separate reticles 43 may be placed in the eyepiece image planes with their markings properly spaced to give reference marks at different apparent distances. For versatility the reticle marks 43 are mounted so that they may be swung to one side as shown by broken lines.

Another feature of a preferred embodiment of the invention has a mirror 40 positionable as shown by broken lines on the optic axis immediately in front of the target 12 and parallel to the plane of divergence of the Wollaston prism 25. The mirror 40 carries a shield 41 with which to cut off the unused half of the target. The effective target is then the remaining part of the target 12 and its mirror image as seen at the mirror 40. The image of this in the primary image plane 14 consists of two halves, one inverted with respect to the other. If a half-wave retardation plate 42, shown in Fig. 10, is placed over one of these images, it will change the polarization of the images in that path of the field. Thus the eyes of the observer will see the images in one-half of the field ortho-stereoscopically and in the other half of the field pseudo-stereoscopically. Which half is which depends on the orientation of the polarizing filters 35.

Alternatively, if a vecto filter, which is colorless to light polarized in one azimuth and red to light polarized at right angles thereto, or preferably two such filters, red and blue respectively to light of the two azimuths, is placed in series with the images, the images will appear differently colored. When combined with the half-wave plate feature, such a color filter, if after the half-wave plate, will give a red image to one eye and blue to the other eye or, if ahead of the half-wave plate, it will give both a red and a blue image to each eye so that the ortho and pseudo pairs of images are oppositely colored, i. e. one red and blue and the other blue and red respectively to the two eyes.

In Fig. 2, the operation of the invention is illustrated in some detail. Light from a target 50 is focused by an objective 51 in an image plane 52. This light is split by a Wollaston prism 53 into two beams represented by rays 54 and 55 respectively. If no further birefringent devices were included in the system these two beams 54 and 55 would come to focus forming two images 56 and 57 whose separation would depend on the distance of the prism 53 from the target 50. However, a second Wollaston prism 58 is included oriented oppositely to the prism 53 so that it bends the beams in opposite directions causing both sets of rays to converge to form a single image 59. If the prism 58 is moved along the optic axis the two images separate, and the separation can vary in either direction from zero.

The operation of a Wollaston prism is shown approximately in Fig. 3 in which two quartz prisms 61 and 62 are cemented with their optic axes oriented at right angles as indicated by the shading, that is, at right angles to each other and also at right angles to the optic axis of the system.

In Fig. 4 a Rochon prism is illustrated made up of two quartz wedges 63 and 64 which differ from the arrangement shown in Fig. 3 by having the optic axis of the wedge 63 parallel to the optic axis of the system. In Fig. 5 a single birefringent crystal 65 such as quartz or calcite is shown, the amount of separation of the light rays depending on the tilt of this crystal relative to the optic axis of the system.

An interesting embodiment of the invention is shown in Fig. 6 in which light from a target 70 is focused by a constant conjugate objective made of lenses 71 and 72 on a primary image plane 73. These lenses 71 and 72 have the same power and are separated by the sum of their focal lengths. Between the lenses is a birefringent device consisting of two Wollaston prisms 74, preferably of equal power so as to give separation of the images without change of vergence. The whole unit including the lenses 71 and 72 and the prisms 74 carried in a mount 75 is axially movable by means of a rack 76 and a pinion 77.

A somewhat simpler arrangement for the same purpose is shown in Fig. 7 wherein a single crystal 80 is used in place of the pair of Wollaston prisms. When the lens system is set with the target at the focal plane of one of the lenses, the light between the lenses is collimated, and any shifting of the beams due to the crystal 80 is nullified when the beams are again brought to focus by lens 72. For any other position of the system relative to the image planes 70 and 73, the images in the plane 73 become separated, approximately in proportion to the distance between this plane and the focal point of a lens 72.

On the other hand, if a variable magnification system is used, the change in magnification may be in the same direction as the change in apparent distance (i. e., becoming smaller as it appears to recede) or vice versa, depending on the orientation of the viewing filters.

Fig. 8 shows the field of view when the reticle 14 is in place but neither the half-wave plate 42 nor the mirror 40 is used. Fig. 9 shows the field when the mirror 40 is in place. Fig. 10 shows the field when both the mirror 40 and the half-wave retardation plate 42 are in place. Fig. 11 shows the field when the half-wave retardation plate 42 is in place, but the mirror 40 is not used. Fig. 12 shows full field coincidence without either the mirror 40 or the plate 42, but including a two-color field provided by a vectodye filter over the whole of the image plane 14. Such a vectodye filter is shown in Fig. 1D. The filter may be neutral to light polarized in one azimuth and colored to light polarized at right angles thereto, or two such filters of different colors may be used at right angles to each other so that one image has one color and the other image has the other color, for example, red and blue.

Having thus described various embodiments of our invention, we wish to point out that it is not limited to these structures, but is of the scope of the appended claims.

What we claim and desire to secure by Letters Patent of the United States is:

1. An instrument for testing and training stereoscopic vision, comprising a target, an objective for forming an image of the target in a primary image plane, birefringent means in series with the objective for splitting the image into two images polarized at right angles, means for moving at least part of the birefringent means axially and continuously to vary the image separation, means for binocularly viewing the polarized images including polarizing filters respectively for the right and left eyes of the observer mutually at right angles, and respectively effectively parallel to the axes of the birefringent means, to permit stereoscopic viewing of the images.

2. An instrument according to claim 1 in which the two images are superimposed on one another for one adjustment of the birefringent means whereby zero is included in the range of image separations.

3. An instrument according to claim 1 in which the birefringent means include two Wollaston prisms on opposite sides of the objective, one fixed and the other movable and oriented to nullify each other and to give zero separation for one position only of the movable prism.

4. An instrument according to claim 1 in which a depth comparison standard reticle is included in the primary image plane.

5. An instrument according to claim 1 in which a comparison standard reticle made of vectographic stereo separations in stereoscopic register is included in the primary image plane, the vectographic axes being respectively parallel to those of the images.

6. An instrument according to claim 1 in which the viewing means includes eyepieces and means for relaying the polarized images to form relayed images in secondary image planes at the focus of the eyepieces.

7. An instrument according to claim 1 in which the viewing means includes at least one lens for relaying an image from the primary image plane to a secondary image plane and in which is included a depth comparison standard reticle and means for moving it alternatively in and out of one of the image planes.

8. An instrument according to claim 1 in which the viewing means includes eyepieces and means for relaying the polarized images to form relayed images in secondary image planes at the focus of the eyepieces and in which stereo separation reticles are positionable respectively in the secondary image planes to form a depth comparison standard with means for moving said reticles alternatively in and out of said planes.

9. An instrument according to claim 1 including a reflecting surface lying substantially on the optic axis of the objective between the target and the objective parallel to the plane of divergence of the birefringent means and means for preventing light from the part of the target behind the reflecting surface from reaching the objective whereby the other part of the target and a mirror image thereof form the effective target.

10. An instrument according to claim 1 including a vectodye filter in the primary image plane to differentially color the images, the vecto axes of the filter being approximately parallel to those of the images.

11. An instrument for stereoscopic vision comprising a target, an objective for forming an image of the target in a primary image plane, a field lens in the primary image plane, a second objective at its focal length from the primary image plane for collimating light therefrom, a beam splitter in the collimated beam for forming right and left eye beams, a lens in each of the latter beams for focusing the light in secondary image planes, right and left eyepieces substantially at their focal length from these secondary image planes, birefringent means in series with the first-mentioned objective between the target and the primary image plane for splitting the image into two images polarized at right angles and polarizing filters with their axes mutually at right angles, and respectively effectively parallel to the axes of the birefringent means, said filters being respectively in the right and left eye beams to permit stereoscopic viewing of the images.

12. An instrument according to claim 11 including means for moving at least part of the birefringent means continuously along the optic axis of the objective to vary the separation of the polarized images.

13. An instrument according to claim 11 including a depth comparison standard reticle in at least one of the image planes.

14. An instrument according to claim 11 including a vectodye filter in the primary image plane to differentially color the images, the vecto axes of the filter being approximately parallel to those of the images.

15. An instrument according to caim 1 in which the target is a transilluminated picture.

16. An instrument according to claim 1 in which the birefringent means includes two birefringent parts, one fixed and one movable oriented to nullify each other and give zero separation of the images for one position of the movable part.

17. An instrument according to claim 1 in which the objective is a constant conjugate one and is also moved along its axis by said moving means.

18. An instrument according to claim 1 in which the objective comprises two equal power positive lenses separated by twice their focal length, the birefringent means is between the two lenses and has lateral separating power without verging power and said moving means moves the objective and the birefringent means as a unit along said optic axis.

STEPHEN M. MacNEILLE.
GEORGE J. KOCH.